(12) United States Patent
Choi (10) Patent No.: US 9,297,192 B2
(45) Date of Patent: Mar. 29, 2016

(54) MULTI-JOINT SLIDER DEVICE

(71) Applicant: Hyundai Motor Company, Seoul (KR)

(72) Inventor: Jae Hong Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/447,345

(22) Filed: Jul. 30, 2014

(65) Prior Publication Data
US 2015/0184440 A1 Jul. 2, 2015

(30) Foreign Application Priority Data

Dec. 26, 2013 (KR) .................. 10-2013-0164110

(51) Int. Cl.
| | |
|---|---|
| *A47H 1/04* | (2006.01) |
| *E05D 15/16* | (2006.01) |
| *E05D 15/06* | (2006.01) |
| *B60J 5/06* | (2006.01) |
| *E05D 15/10* | (2006.01) |

(52) U.S. Cl.
CPC .............. *E05D 15/0621* (2013.01); *B60J 5/06* (2013.01); *E05D 15/101* (2013.01); *E05Y 2201/64* (2013.01); *E05Y 2900/531* (2013.01); *Y10T 16/3825* (2015.01)

(58) Field of Classification Search
CPC .............. Y10T 16/364; Y10T 16/3813; Y10T 16/3837; Y10T 16/384; Y10T 16/3825; E05D 15/00; E05D 15/1005; E05D 15/28; E05D 15/0608; E05D 15/0626; E05D 15/264; E05D 15/06; E05D 15/063; E05D 15/0643; E05D 15/0647; E05D 15/165; E05Y 2201/64; E05Y 2201/688; E05Y 2201/708; E05Y 2201/612; E05Y 2201/614; E05Y 2900/531; E05Y 2900/532; E06B 3/50; E06B 3/485; B60J 5/06; B60J 5/062; B60J 5/047; B60J 5/12; B60J 5/04
USPC .................... 16/90, 91, 94 R, 96 R, 95 R, 97, 16/101–107, 87 R, 84 R, 87.6 R, 87.8, 273; 160/185, 199; 49/404, 405, 409, 410, 49/411, 412, 420, 421–425, 453, 455; 296/146.1, 155
See application file for complete search history.

(56) References Cited

U.S. PATENT DOCUMENTS

| | | | | | |
|---|---|---|---|---|---|
| 3,190,236 | A | * | 6/1965 | Leach ........................... | 198/683 |
| 3,411,457 | A | * | 11/1968 | Gotsch, Jr. ................ | 104/172.4 |
| 3,415,202 | A | * | 12/1968 | Dehne .......................... | 104/242 |
| 3,443,526 | A | * | 5/1969 | Gee ................................. | 104/96 |

(Continued)

FOREIGN PATENT DOCUMENTS

| | | |
|---|---|---|
| JP | 08-47237 A | 2/1996 |
| JP | 10-159460 A | 6/1998 |
| JP | 2001-113947 A | 4/2001 |

*Primary Examiner* — Chuck Mah
(74) *Attorney, Agent, or Firm* — Morgan, Lewis & Bockius LLP (57) ABSTRACT

A multi joint slider device may include a center slider arranged at a center in a length direction thereof, the center slider having at least one roller, a front slider arranged in front of the center slider connected thereto with a first joint to enable relative rotation, the front slider having at least one roller, and a rear slider arranged in rear of the center slider connected thereto with a second joint to enable relative rotation, the rear slider having at least one roller, thereby permitting smooth rolling and sliding on the rail having a curved portion.

14 Claims, 6 Drawing Sheets

(56) References Cited

U.S. PATENT DOCUMENTS

| | | | |
|---|---|---|---|
| 3,580,183 A * | 5/1971 | Nearman | 104/111 |
| 4,112,540 A * | 9/1978 | Wright et al. | 16/99 |
| 4,157,846 A * | 6/1979 | Whitcroft | 296/155 |
| 4,561,359 A * | 12/1985 | Duce | 104/94 |
| 5,090,171 A * | 2/1992 | Kano et al. | 52/243.1 |
| 5,542,149 A * | 8/1996 | Yu | 16/87.4 R |
| 6,141,827 A * | 11/2000 | Wu | 16/91 |
| 2001/0006298 A1 * | 7/2001 | Tsubokura et al. | 296/155 |
| 2001/0022049 A1 * | 9/2001 | Clark et al. | 49/360 |
| 2009/0056077 A1 * | 3/2009 | Belanger et al. | 16/364 |
| 2010/0038041 A1 * | 2/2010 | Liao | 160/196.1 |
| 2011/0232030 A1 * | 9/2011 | Walhorn et al. | 16/91 |
| 2012/0011681 A1 * | 1/2012 | Scharf et al. | 16/87.8 |
| 2012/0031004 A1 * | 2/2012 | Boettcher | 49/154 |
| 2013/0074283 A1 * | 3/2013 | Lagarde | 16/102 |
| 2014/0237901 A1 * | 8/2014 | Kwon et al. | 49/449 |
| 2014/0318017 A1 * | 10/2014 | Linkner | 49/176 |

* cited by examiner

MULTI-JOINT SLIDER DEVICE

CROSS-REFERENCE TO RELATED APPLICATION

The present application claims priority to and the benefit of Korean Patent Application No. 10-2013-0164110 filed on Dec. 26, 2013, the entire contents of which is incorporated herein for all purposes by this reference.

BACKGROUND OF THE INVENTION

1. Field of the Invention

The present invention relates to a multi-joint slider device. More particularly, the present invention relates to a multi-joint slider device having two or more than two joints which can roll along a rail curved at a predetermined angle, easily.

2. Description of Related Art

In general, the vehicle has a predetermined sized cabin formed therein for boarding of a driver and accompanying occupants therein, and cabin opening/closing doors are mounted to the vehicle body for opening/closing the cabin.

In general, in a case of a passenger vehicle, though the cabin opening/closing doors are rotatably mounted to the vehicle body with hinges, in a case of a van on which many people may board, the cabin opening/closing door opens/closes the cabin as the cabin opening/closing door slides forward/backward in the length direction of the vehicle.

While the sliding type opening/closing door of the van opens the cabin as the cabin opening/closing door moves backward in a length direction of the vehicle, the sliding type opening/closing door of the van closes the cabin as the cabin opening/closing door moves forward in the length direction of the vehicle. In order to open/close the cabin opening/closing door is in a sliding type, the slider device is required.

A related art slider device of a vehicle door is provided with an upper rail and a lower rail mounted to a vehicle body, and a center rail mounted to the cabin door for guiding movement of the cabin opening/closing door, and rollers mounted to the rails for rolling along the rails.

In the meantime, since the related art slider device of the cabin opening/closing door only has a linear rail extended in a length direction of the vehicle and a width direction of the cabin opening/closing door, and a linear slider only movable along the linear rail, the related art slider device has many limitations in view of mounting and operation of the cabin opening/closing door, and drawbacks, such as the opening/closing movement of the cabin opening/closing is not smooth.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multi-joint slider device having advantages of improved degrees of freedom of motion and mounting of the rail and the slider.

Devised taking above problem into account, an object of an exemplary embodiment of the present invention is to provide a multi-joint slider device which can roll smoothly even when a curved portion is formed at a predetermined portion of a rail in a length direction thereof for improving degrees of freedom of motion and degrees of freedom of mounting of the rail and the slider.

In an aspect of the present invention, a multi-joint slider device may include a center slider arranged at a center in a length direction thereof, the center slider having at least one roller, a front slider arranged in front of the center slider and connected thereto with a first joint to enable relative rotation, the front slider having at least one roller, and a rear slider arranged in rear of the center slider and connected thereto with a second joint to enable relative rotation, the rear slider having at least one roller.

The multi-joint slider device may further include a rail having a center rail arranged at middle in a height direction thereof, an upper side rail arranged over the center rail in the height direction, and a lower side rail arranged under the center rail in the height direction.

The center rail, the upper side rail and the lower side rail may be formed as one unit.

The center rail, the upper side rail and the lower side rail may have "⊏" shaped cross sections continuous in the length direction, respectively.

The center rail may have an opening to which openings of the upper side rail, and the lower side rail are arranged perpendicular, and the openings of the upper side rail and the lower side rail may be formed to face each other.

The rail may have a curved portion with a moderate curve at a predetermined portion thereof in the length direction.

The center slider may include a center slider body, two upper side rail rollers rotatably coupled to an upper side of the center slider body to be inserted in the upper side rail for rolling, and two lower side rail rollers rotatably coupled to a lower side of the center slider body to be inserted in the lower side rail for rolling.

The center slider body may include a support wall portion formed extendedly vertically in an up/down direction, an upper flange formed bent and extended from an upper edge of the support wall portion perpendicular thereto, and a lower flange formed bent and extended from a lower edge of the support wall portion perpendicular thereto, wherein two first assembly holes may be formed in the upper side of the support wall portion on left and right sides thereof at a predetermined distance, to mount the two upper side rail rollers thereto rotatably, and two first assembly holes may be formed in the lower side of the support wall portion on the left and right sides thereof at a predetermined distance, to mount the two lower side rail rollers thereto, rotatably.

One end of an arm having a sliding component mounted thereto may be inserted between the upper flange and the lower flange and rotatably secured with an assembly pin.

The support wall portion may have assembly flanges formed on the left and right sides of the upper side and the lower side projected to a left side and a right side respectively, the front slider may include a front slider body, the front slider body may have an assembly flange formed on a rear side thereof, the rear slider may include a rear slider body, the rear slider body may have an assembly flange formed on a front side thereof, the assembly flange of the front slider body may be inserted between the two upper and lower assembly flanges of the center slider body, and secured with an assembly pin to form a first joint, and the assembly flange of the rear slider body may be inserted between the upper and lower assembly flanges of the center slider body, and secured with an assembly pin to form a second joint.

The front slider body may have a first assembly boss formed on one side thereof as one unit therewith projected to a side direction, the center rail roller may be inserted into the first assembly boss to be rotatably mounted.

A second assembly boss may be formed adjacent to the first assembly boss as one unit therewith projected upward, an upper side rail support roller may be rotatably assembled to an upper side of the second assembly boss to be inserted in the upper side rail and supported thereby, and a lower rail support roller may be rotatably assembled to a lower side of the second assembly boss to be inserted in the lower side rail and supported thereby.

The rear slider body may have a first assembly boss formed on one side thereof as one unit therewith projected in a side direction, and a center rail roller may be rotatably mounted to the first assembly boss for inserting in the center rail for rolling.

A substantially "T" shaped assembly groove may be formed in a portion adjacent to the first assembly boss in a vertical direction, a plurality of fastening holes may be formed in a bottom of the assembly groove in communication therewith, an adjuster block may be inserted in the assembly groove and fastened through the fastening holes, and an adjuster roller may be assembled to, and rotatably supported by the adjuster block for being in contact with an upper side of the upper side rail to support the upper side rail.

The rear slider body may have a second assembly boss formed on a rear side thereof extended vertically, an upper side rail support roller may be rotatably assembled to the upper side of the second assembly boss for being inserted in the upper side rail for rolling, and a lower side rail support roller may be rotatably assembled to the lower side of the second assembly boss for being inserted in the lower side rail for rolling.

Since the multi-joint slider device in accordance with an exemplary embodiment of the present invention can roll to pass the curved portion in the rail, the multi-joint slider device solves the problem of providing a linear rail to resolve a mounting limitation to improve degrees of freedom of mounting, and, since the slider device of the present invention is able to make two-dimensional movement of forward/backward, and left/right in comparison to the related art slider device which can only make linear movement of forward/backward, or left/right, the multi-joint slider device of the present invention can improve degrees of freedom of motion, too.

If the multi-joint slider device in accordance with an exemplary embodiment of the present invention is applied to the cabin opening/closing door of a vehicle, since the cabin opening/closing door can be opened/closed in the length direction of the vehicle, opening/closing of the cabin opening/closing door can be made smoothly even when the cabin opening/closing door has a small opening/closing space.

And, since an opening/closing space formed in the vehicle body can be opened wholly, getting on/off the vehicle can be made conveniently, and the cabin opening/closing door can be opened/closed smoothly.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a multi-joint slider device in accordance with an exemplary embodiment of the present invention will be described with reference to the attached drawings.

Figure 1:
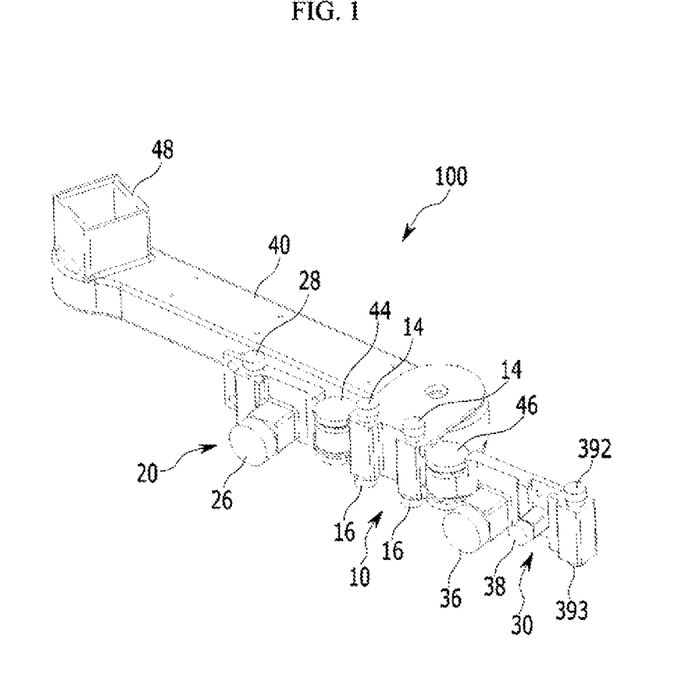
FIG. 1 illustrates a perspective view of a multi-joint slider in accordance with an exemplary embodiment of the present invention.
Figure 2:
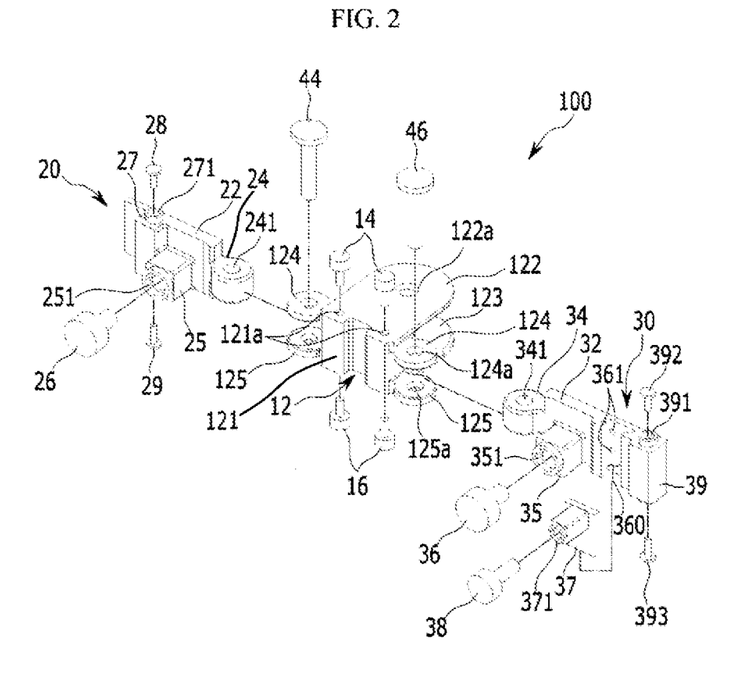
FIG. 2 illustrates an exploded perspective view of a multi-joint slider in accordance with an exemplary embodiment of the present invention.

Referring to FIGS. 1 and 2, the multi-joint slider device in accordance with an exemplary embodiment of the present invention may include a multi-joint slider 100.

The multi-joint slider 100 may include a center slider 10 arranged at a center in a length direction thereof, a front slider 20 coupled to a front of the center slider 10 to enable relative rotation, and a rear slider 30 coupled to a rear of the center slider 10 to enable relative rotation.

According to this, a first joint is formed between the front slider 20 and the center slider 10, and a second joint is formed between the center slider 10 and the rear slider 30, to form a two joint slider, on the whole.

The center slider 10 may include a center slider body 12, two upper side rail rollers 14 rotatably coupled to an upper side of the center slider body 12, and two lower side rail rollers 16 rotatably coupled to a lower side of the center slider body 12.

The center slider body 12 may include a support wall portion 121 formed extended vertically in an up/down direction, an upper flange 122 formed bent and extended from an upper edge of the support wall portion 121 perpendicular thereto, and a lower flange 123 formed bent and extended from a lower edge of the support wall portion 121 perpendicular thereto.

Formed in the upper side of the support wall portion 121 on left and right sides thereof, there may be two first assembly holes 121a at a predetermined distance, and formed in the lower side of the support wall portion 121 on the left and right sides thereof, there may also be the two first assembly holes at a predetermined distance.

The two upper side rail rollers 14 may be inserted in, and rotatably supported by, two first assembly holes 121a on the left and right sides of the upper side of the support wall portion 121, respectively.

The two lower side rail rollers 16 may be inserted in, and rotatably supported by, two first assembly holes on the left and right sides of the lower side of the support wall portion 121, respectively.

The upper flange 122 may include a circular arc shaped mounting portion, having a passed through second assembly hole 122a.

The lower flange 123 may include a circular arc shaped mounting portion, having the passed through second assembly hole.

Between the upper flange 122 and the lower flange 123, there may be one end of an arm 40 inserted, and rotatably secured with an assembly pin 42.

The arm 40 has the other end with a substantially square box shaped assembly projection 48 projected therefrom, vertically.

The assembly projection 48 may have a slidable component, for an example, a cabin opening/closing door of the vehicle, mounted thereto and supported thereby.

Formed on the left and right sides of the upper side of the support wall portion 121, there are circular assembly flanges 124 projected to a left side and a right side respectively, and also formed on the left and right sides of the lower side of the support wall portion 121, there are circular assembly flanges 125 projected to the left side and the right side, respectively.

The upper assemble flange 124 and the lower assemble flange 125 may have pass through assembly holes 124a and 125a formed therein, respectively.

The front slider 20 may include a front slider body 22 of a rectangular plate shape, substantially.

The front slider body 22 may have a circular assembly flange 24 formed on a rear side thereof, with a pass through assembly hole 241 formed therein.

The rear slider 30 may also include a rectangular plate shaped rear slider body 32.

The rear slider body 32 may have a circular assembly flange 34 formed on a front side thereof, with a pass through assembly hole 341 formed therein.

The assembly flange 24 of the front slider body 22 is inserted between the two upper and lower assembly flanges 124 and 125 of the center slider body 12, and the second assembly pin 44 is assembled in the assembly holes 124a, 241, and 125a of respective assembly flanges 124, 24, and 125, thereby coupling the front slider 20 to the center slider 10 to enable relative rotation.

The assembly flange 34 of the rear slider body 32 is also inserted between the upper and lower assembly flanges 124 and 125 of the center slider body 12, and the third assembly pin 46 is assembled in the assembly holes 124a, 341, and 125a of the respective assembly flanges 124, 34, and 125, thereby coupling the rear slider 30 to the center slider 10 to enable relative rotation.

The front slider body 22 may have a first assembly boss 25 formed on one side thereof as one unit therewith projected to a side direction, with an assembly hole 251 formed therein for inserting, and rotatably mounting a center rail roller 26 therein.

Formed adjacent to the first assembly boss 25, there is a second assembly boss 27 formed as one unit therewith projected upward.

The second assembly boss 27 has assembly holes 271 formed in upper and lower sides respectively, wherein an upper side rail support roller 28 is rotatably assembled in the assembly hole 271 in the upper side, and a lower rail support roller 29 is rotatably assembled in the assembly hole 271 in the lower side for being inserted in the upper side rail and the lower side rail respectively to support a load applied to the multi-joint slider through a slider component mounted to the arm 40.

The rear slider body 32 may have a first assembly boss 35 formed on one side thereof as one unit therewith projected in a side direction, with a first assembly hole 351 formed therein for inserting, and rotatably mounting a center rail roller 36 therein.

Adjacent to the first assembly boss 35, there may be a substantially "T" shaped assembly groove 360 formed therein in a vertical direction having a plurality of fastening holes 361 formed in a bottom in communication with the assembly groove 360.

The assembly groove 360 may have an adjuster block 37 inserted therein fastened with screws or the like passed through the fastening holes 361.

The adjuster block 37 may have an assembly hole 371 formed in one side thereof, with an adjuster roller 38 rotatably assembled therein.

The adjuster roller 38 is in contact with an upper side of the upper side rail for supporting the load applied thereto through the arm 40.

The adjuster block 37 may be selectively fastened to the plurality of fastening holes 361 for carrying out a function of absorbing tolerances of the rail and the roller.

The rear slider body 32 may have a second assembly boss 39 formed on a rear side thereof extended vertically, with assembly holes 391 formed in upper and lower sides thereof, respectively.

An upper side rail support roller 392 is rotatably assembled in the upper side assembly hole 391, and a lower side rail support roller 393 is rotatably assembled in the lower side assembly hole for being inserted in the upper side rail and the lower side rail respectively to support a load applied to the multi-joint slider through a slider component mounted to the arm 40.

The rollers may be rotatably mounted with, for an example, bearings built therein, respectively.

Figure 3:
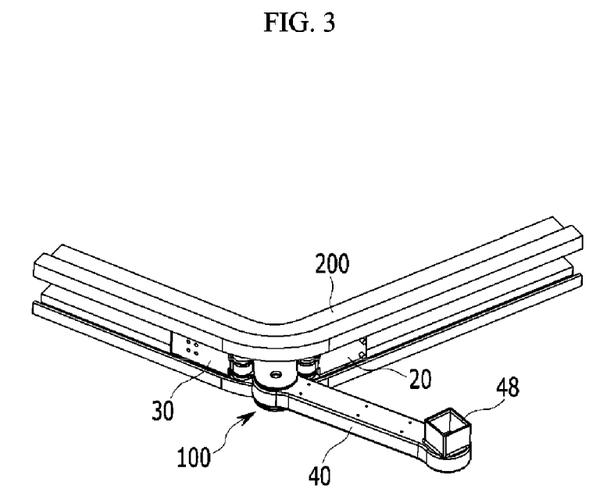
FIG. 3 illustrates a perspective view of a multi-joint slider in accordance with an exemplary embodiment of the present invention, mounted to a rail.
Figure 4:
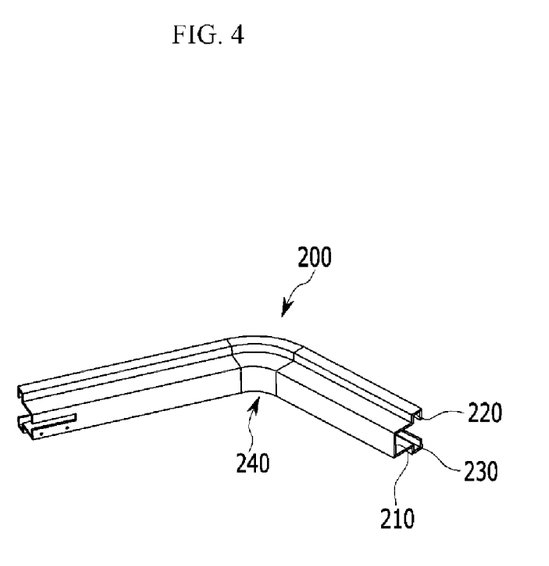
FIG. 4 illustrates a perspective view of a rail in accordance with an exemplary embodiment of the present invention.

Referring to FIGS. 3 and 4, the multi-joint slider 100 in accordance with an exemplary embodiment of the present invention may be inserted in the rail 200 to roll with the rollers.

The rail 200 may include a center rail 210 positioned at middle in a height direction, an upper side rail 220 positioned over the center rail 210, and a lower side rail 230 positioned under the center rail 210.

The center rail 210, the upper side rail 220, and the lower side rail 230 may be formed as one unit.

The center rail 210, the upper side rail 220, and the lower side rail 230 may have " ⊏ " shaped cross sections continuous in a length direction thereof, respectively.

The center rail 210 may have an opening to which openings of the upper side rail 220, and the lower side rail 230 are arranged perpendicular, and the openings of the upper side rail 220 and the lower side rail 230 are formed to face each other.

The rail 200 may have a curved portion 240 with a moderate curve at a predetermined portion thereof in the length direction.

Figure 5:
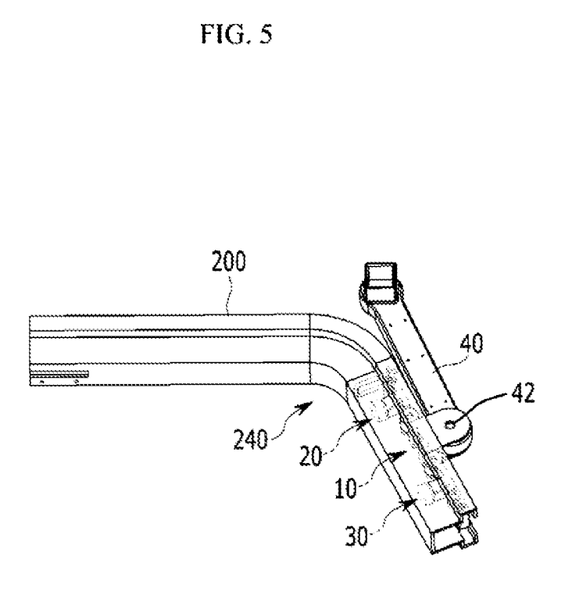
FIG. 5 illustrates a perspective view for describing an operation state in which a multi-joint slider in accordance with an exemplary embodiment of the present invention is before entering a curved portion of a rail.
Figure 6:
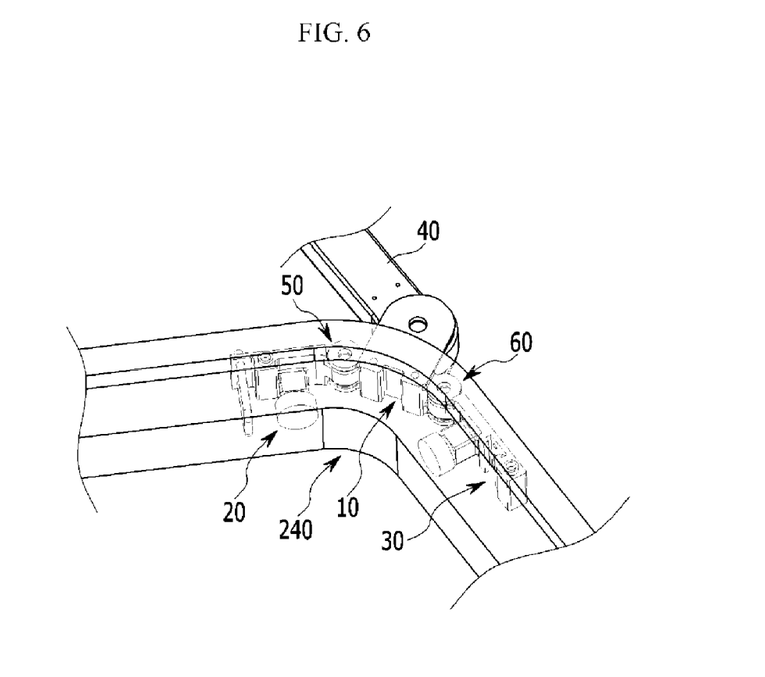
FIG. 6 illustrates a perspective view for describing a process in which a multi-joint slider in accordance with an exemplary embodiment of the present invention is passing through a curved portion of a rail.

Referring to FIGS. 5 and 6, the multi-joint slider 100 in accordance with an exemplary embodiment of the present invention may be inserted in the rail 200 to slide therein owing to rolling of the rollers.

At the time the multi-joint slider 100 is inserted in, and assembled with, the rail 200, the multi-joint slider 100 is assembled such that the front slider 20 is positioned on a front side, and the center slider 10 and the rear slider 30 are positioned in a rear side thereof in succession.

And, the two center rail rollers 26 and 36 are inserted in the center rail 210 to roll along the center rail 210, the two upper side rail rollers 14 and the upper side rail support rollers 28 and 392 are inserted in the upper side rail 220 to roll along the upper side rail 220, and the two lower side rail rollers 16 and the lower rail support rollers 29 and 393 are inserted in the lower side rail 230 to roll along the lower side rail 230.

When the multi-joint slider 100 is passing through the curved portion 240 of the rail 200, the assembly flange 24 of the front slider 20, the assembly flanges 124 and 125 and the assembly pin 44 of the center slider 10 form a first joint 50 allowing to form a bending angle between the front slider 20 and the center slider 10, and the assembly flanges 124 and 125 of the center slider 10 and the assembly flange 34 and assembly pin 46 of the rear slider 30 form a second joint 60 allowing to form a bending angle between the rear slider 30 and the center slider 10, too.

Even if the rail 200 has the curved portion 240, since the front slider 20, the center slider 10 and the rear slider 30 make an appropriate relative turn according to the bending angle of the curved portion 240 by means of the two first and second joints 50 and 60, the multi-joint slider 100 can pass through the curved portion 240 without interference with the curved portion 240 of the rail, smoothly.

And, if the cabin opening/closing door is connected to the multi-joint slider 100, since the multi-joint slider 100 can move along the rail smoothly in a state the multi-joint slider 100 is supporting the cabin opening/closing door properly, the cabin opening/closing door can be moved forward/backward, for an example, in the length direction of the vehicle, to open/close the cabin.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A multi joint slider device comprising:
   a center slider arranged at a center in a length direction thereof, the center slider having at least one roller;
   a front slider arranged in front of the center slider connected to the front slider with a first joint to enable relative rotation therebetween, the front slider having at least one roller;
   a rear slider arranged in rear of the center slider connected to the rear slider with a second joint to enable relative rotation therebetween, the rear slider having at least one roller; and
   a rail having a center rail arranged at middle in a height direction thereof, an upper side rail arranged over the center rail in the height direction, and a lower side rail arranged under the center rail in the height direction,
   wherein the center slider, the front slider, and the rear slider are slidably engaged to the rail.

2. The multi joint slider device of claim 1, wherein the center rail, the upper side rail and the lower side rail are formed as one unit.

3. The multi joint slider device of claim 2, wherein the center rail, the upper side rail and the lower side rail have a channel-shaped cross sections continuous in the length direction thereof, respectively.

4. The multi joint slider device of claim 3,
   wherein the center rail has an opening to which openings of the upper side rail, and the lower side rail are arranged perpendicular, and
   wherein the openings of the upper side rail and the lower side rail are formed to face each other.

5. The multi joint slider device of claim 1, wherein the rail has a curved portion with a curve at a predetermined portion thereof in the length direction.

6. The multi joint slider device of claim 1, wherein the center slider includes;
   a center slider body,
   two upper side rail rollers rotatably coupled to an upper side of the center slider body to be inserted in the upper side rail for rolling, and
   two lower side rail rollers rotatably coupled to a lower side of the center slider body to be inserted in the lower side rail for rolling.

7. The multi joint slider device of claim 6, wherein the center slider body includes;
   a support wall portion formed extendedly vertically in an up and down direction;
   an upper flange formed bent and extended from an upper edge of the support wall portion perpendicular thereto; and
   a lower flange formed bent and extended from a lower edge of the support wall portion perpendicular thereto,
   wherein two first assembly holes are formed in an upper side of the support wall portion along a longitudinal direction of the multi joint slider device at a predetermined distance, to mount the two upper side rail rollers thereto rotatably, and
   wherein two first assembly holes are formed in a lower side of the support wall portion along the longitudinal direction of the multi joint slider device at a predetermined distance, to mount the two lower side rail rollers thereto, rotatably.

8. The multi joint slider device of claim 7, wherein one end of an arm having a sliding component mounted thereto is inserted between the upper flange and the lower flange and rotatably secured with an assembly pin.

9. The multi joint slider device of claim 8,
   wherein the support wall portion has assembly flanges formed on both sides of the upper side and the lower side projected in the longitudinal direction of the multi joint slider device, respectively,
   wherein the front slider includes a front slider body that has an assembly flange formed on a rear side thereof, wherein the rear slider includes a rear slider body that has an assembly flange formed on a front side thereof, wherein the assembly flange of the front slider body is inserted between the two upper and lower assembly flanges of the center slider body, and secured with a first assembly pin to form the first joint, and wherein the assembly flange of the rear slider body is inserted between the upper and lower assembly flanges of the center slider body, and secured with a second assembly pin to form the second joint.

10. The multi joint slider device of claim 9, wherein the front slider body has a first assembly boss formed on one side thereof as one unit therewith projected to a side direction, and wherein a center rail roller is inserted into the first assembly boss to be rotatably mounted.

11. The multi joint slider device of claim 10, wherein a second assembly boss is formed adjacent to the first assembly boss as one unit therewith projected upward, wherein an upper side rail support roller is rotatably assembled to an upper side of the second assembly boss to be inserted in the upper side rail and supported thereby, and wherein a lower rail support roller is rotatably assembled to a lower side of the second assembly boss to be inserted in the lower side rail and supported thereby.

12. The multi joint slider device of claim 9, wherein the rear slider body has a first assembly boss formed on one side thereof as one unit therewith projected in a side direction, and wherein a center rail roller is rotatably mounted to the first assembly boss for inserting in the center rail for rolling.

13. The multi joint slider device of claim 12, wherein a substantially "T" shaped assembly groove is formed in a portion adjacent to the first assembly boss in a vertical direction, wherein a plurality of fastening holes are formed in a bottom of the assembly groove in communication therewith, wherein an adjuster block is inserted in the assembly groove and fastened through the fastening holes, and wherein an adjuster roller is assembled to, and rotatably supported by the adjuster block for being in contact with an upper side of the upper side rail to support the upper side rail.

14. The multi joint slider device of claim 13, wherein the rear slider body has a second assembly boss formed on a rear side thereof extended vertically, wherein an upper side rail support roller is rotatably assembled to the upper side of the second assembly boss for being inserted in the upper side rail for rolling, and wherein a lower side rail support roller is rotatably assembled to the lower side of the second assembly boss for being inserted in the lower side rail for rolling.

* * * * *